United States Patent
Ikeya et al.

(10) Patent No.: US 9,411,043 B2
(45) Date of Patent: Aug. 9, 2016

(54) RADAR APPARATUS AND COMPUTER-READABLE STORAGE MEDIUM

(71) Applicant: FUJITSU LIMITED, Kawasaki-shi, Kanagawa (JP)

(72) Inventors: Tomonori Ikeya, Sagamihara (JP); Junko Kajiki, Kawasaki (JP); Kazuhiko Shite, Sagamihara (JP); Mitsuru Ochi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 364 days.

(21) Appl. No.: 14/090,631

(22) Filed: Nov. 26, 2013

(65) Prior Publication Data

US 2014/0266855 A1    Sep. 18, 2014

(30) Foreign Application Priority Data

Mar. 18, 2013    (JP) .................. 2013-055484

(51) Int. Cl.
*G01S 13/93* (2006.01)
*G01S 7/35* (2006.01)
*G01S 13/34* (2006.01)

(52) U.S. Cl.
CPC .............. *G01S 13/931* (2013.01); *G01S 7/354* (2013.01); *G01S 13/345* (2013.01)

(58) Field of Classification Search
CPC ...... G01S 7/354; G01S 13/931; G01S 13/345
USPC ............... 342/27, 70–72, 115, 175, 190, 195
See application file for complete search history.

(56) References Cited

U.S. PATENT DOCUMENTS

| | | | | |
|---|---|---|---|---|
| 4,075,686 A | * | 2/1978 | Calle | G06F 12/0888 711/113 |
| 4,080,599 A | * | 3/1978 | Conti | G01S 7/2923 342/195 |
| 4,298,929 A | * | 11/1981 | Capozzi | G06F 12/0804 711/118 |
| 4,357,656 A | * | 11/1982 | Saltz | G11C 29/24 711/113 |

(Continued)

FOREIGN PATENT DOCUMENTS

| | | |
|---|---|---|
| EP | 2034331 A1 | 3/2009 |
| JP | 2001-223660 | 8/2001 |

(Continued)

OTHER PUBLICATIONS

Korean Office Action mailed Oct. 31, 2014 in corresponding Korean Patent Application No. 10-2013-151301.

(Continued)

*Primary Examiner* — Peter Bythrow
(74) *Attorney, Agent, or Firm* — Staas & Halsey LLP

(57) ABSTRACT

A radar apparatus to detect an object includes a detecting unit configured to detect the object based on a reflected wave received in response to transmitting a transmission wave, in order to output a detection result of the object, a storage unit including a first storage part to store the detection result, and a second storage part to store a copy of information stored in the first storage part based on a copy command, and a selecting unit configured to select one of the first storage part and the second storage part as an access destination, in order to output the detection result stored in one of the first storage part and the second storage part selected as the access destination.

11 Claims, 15 Drawing Sheets

(56) References Cited

U.S. PATENT DOCUMENTS

| | | | | | |
|---|---|---|---|---|---|
| 4,382,278 | A | * | 5/1983 | Appelt | G06F 12/0875 365/189.17 |
| 4,394,774 | A | * | 7/1983 | Widergren | H04N 11/044 341/51 |
| 4,500,954 | A | * | 2/1985 | Duke | G06F 12/0866 711/113 |
| 4,530,049 | A | * | 7/1985 | Zee | G06F 9/4426 711/132 |
| 4,626,988 | A | * | 12/1986 | George | G06F 9/381 711/125 |
| 4,635,194 | A | * | 1/1987 | Burger | G06F 9/30054 712/205 |
| 4,669,043 | A | * | 5/1987 | Kaplinsky | G06F 12/1063 711/108 |
| 4,719,568 | A | * | 1/1988 | Carrubba | G06F 9/30047 711/123 |
| 4,937,738 | A | * | 6/1990 | Uchiyama | G06F 12/0888 711/118 |
| 5,247,639 | A | * | 9/1993 | Yamahata | G06F 12/0888 711/138 |
| 5,276,851 | A | * | 1/1994 | Thacker | G06F 12/0831 345/542 |
| 5,287,452 | A | * | 2/1994 | Newman | G09G 5/363 345/501 |
| 5,966,728 | A | * | 10/1999 | Amini | G06F 12/0835 711/146 |
| 6,211,814 | B1 | * | 4/2001 | Benjamin | G01S 7/298 342/185 |
| 6,424,292 | B1 | * | 7/2002 | Fujikawa | G01S 7/04 342/175 |
| 6,441,775 | B1 | * | 8/2002 | Fujikawa | G01S 7/064 342/175 |
| 6,651,113 | B1 | * | 11/2003 | Grimsrud | G06F 3/0613 710/22 |
| 6,798,374 | B1 | * | 9/2004 | Smith | G01S 13/536 342/104 |
| 7,454,585 | B2 | * | 11/2008 | Arimilli | G06F 9/30032 711/118 |
| 7,484,062 | B2 | * | 1/2009 | Arimilli | G06F 9/30032 711/118 |
| 7,733,266 | B2 | * | 6/2010 | Kikuchi | G01S 13/931 342/175 |
| 7,882,321 | B2 | * | 2/2011 | Arimilli | G06F 9/30032 711/165 |
| 8,170,095 | B2 | * | 5/2012 | Roman | H04N 19/115 375/240 |
| 9,092,429 | B2 | * | 7/2015 | Higham | G06F 13/28 |
| 2003/0222812 | A1 | * | 12/2003 | Kishida | G01S 7/295 342/109 |
| 2005/0046611 | A1 | * | 3/2005 | Safran | G08B 13/19669 342/195 |
| 2009/0069952 | A1 | * | 3/2009 | Kikuchi | G01S 13/931 701/1 |
| 2011/0074622 | A1 | * | 3/2011 | Shibata | G01S 13/345 342/90 |
| 2015/0022393 | A1 | * | 1/2015 | Nishiyama | G01S 7/064 342/179 |

FOREIGN PATENT DOCUMENTS

| | | |
|---|---|---|
| JP | 2006-163879 | 6/2006 |
| KR | 1986-0002049 | 3/1986 |

OTHER PUBLICATIONS

Extended European Search Report mailed Feb. 26, 2014 in corresponding European Patent Application No. 13194229.4.

Patent Abstracts of Japan, Publication No. 2006-163879, Published Jun. 22, 2006.

Patent Abstracts of Japan, Publication No. 2001-223660, Published Aug. 17, 2001.

Korean Office Action dated Aug. 17, 2015 in corresponding Korean Patent Application No. 10-2013-0151301.

* cited by examiner

FIG.15
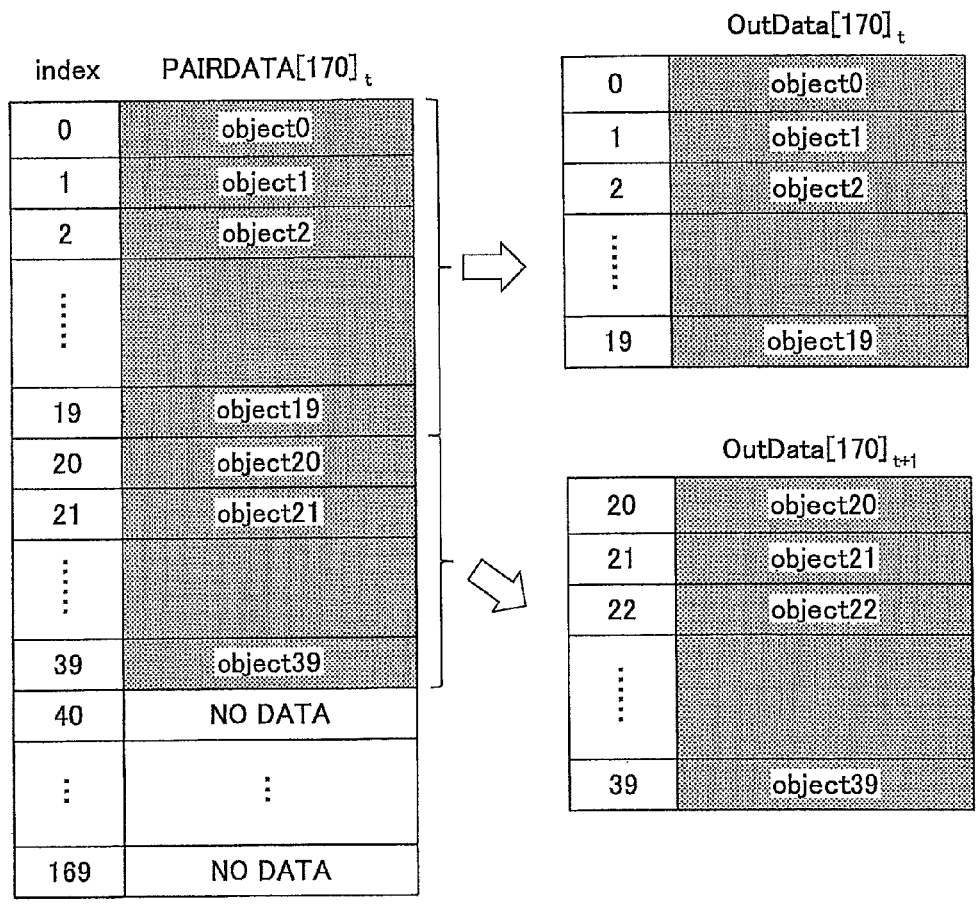
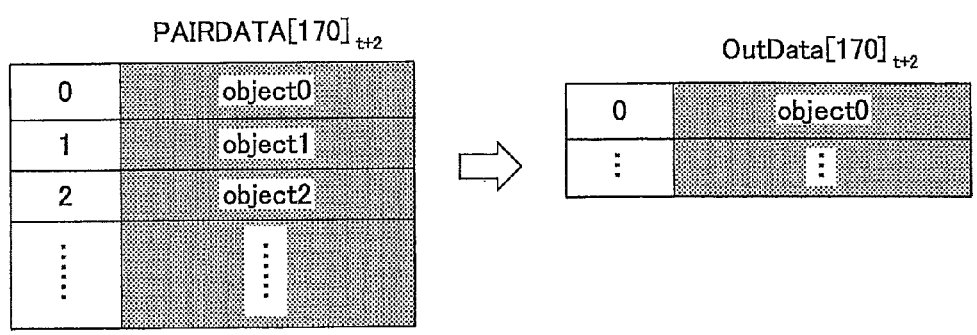

RADAR APPARATUS AND COMPUTER-READABLE STORAGE MEDIUM

CROSS-REFERENCE TO RELATED APPLICATIONS

This application is based upon and claims the benefit of priority of the prior Japanese Patent Application No. 2013-055484, filed on Mar. 18, 2013, the entire contents of which are incorporated herein by reference.

FIELD

The embodiments discussed herein are related to a radar apparatus and a computer-readable storage medium.

BACKGROUND

A scan type radar apparatus that detects an object and the like may be used in a monitoring system or the like. For example, an FM-CW (Frequency Modulated-Continuous Wave) radar apparatus continuously transmits a transmission wave without intermission by periodically changing the frequency of the transmission wave. Because the frequency of the transmission wave is changed when a reflected wave from a detection target is received, a time delay of the reflected wave may be measured from a frequency difference between the transmission wave and the received reflected wave, in order to detect a distance from the FM-CW radar apparatus and the detection target and a moving velocity of the detection target. For this reason, when the FM-CW radar apparatus is used in a traffic monitoring system, for example, and a number of vehicles and a velocity of the vehicles traveling in each lane of a road are detected by the FM-CW radar apparatus, it is possible to detect a state of the traffic in each lane of the road may, and an obstructing object such as trash existing on the lane of the road.

The FM-CW radar apparatus detects the detection target by pairing a difference between the transmission wave and the reflected wave in a frequency raising interval, and a difference between the transmission wave and the reflected wave in a frequency lowering interval. For example, the detection results of a predetermined number of pairs within a certain time are output outside the FM-CW radar apparatus with a predetermined format. For this reason, when the number of pairs becomes extremely large as a result of the pairing, data of the detection target are desirably transferred at a relatively high transfer rate. However, the development time and the development cost would increase if a radar apparatus capable of transferring the data at the high transfer rate were to be developed, and it is difficult to create a relatively inexpensive radar apparatus.

On the other hand, when the transfer rate of the data of the detection target is relatively low, the number of detection targets (that is, the number of pairs) detectable within a predetermined time becomes limited. Consequently, in the case of a vehicle radar, for example, which is relatively inexpensive but has a relatively low data transfer rate, the increase in the development time and the development cost may be suppressed, however, the number of detectable detection targets becomes limited.

Examples of radar apparatuses are proposed in Japanese Laid-Open Patent Publications No. 2006-163879 and No. 2001-223660, for example.

According to the conventional radar apparatus, it is difficult to output the detection results of a relatively large number of detection targets when the data transfer rate is relatively low.

SUMMARY

Accordingly, it is an object in one aspect of the embodiment to provide a radar apparatus and a computer-readable storage medium that may output detection results of a relatively large number of detection targets even in a case in which a data transfer rate is relatively low.

It is an object in another aspect of the embodiment to provide a radar apparatus and a computer-readable storage medium that may enable transfer of contents of a previous detection result, even in a case in which a transfer process to transfer stored contents of a detection result that is obtained according to the scan of the radar apparatus is not completed until an updating by a new detection result that is obtained according to a next scan of the radar apparatus.

According to one aspect of the present invention, a radar apparatus to detect an object may include a detecting unit configured to detect the object based on a reflected wave received in response to transmitting a transmission wave, in order to output a detection result of the object; a storage unit including a first storage part to store the detection result, and a second storage part to store a copy of information stored in the first storage part based on a copy command; and a selecting unit configured to select one of the first storage part and the second storage part as an access destination, in order to output the detection result stored in one of the first storage part and the second storage part selected as the access destination.

According to another aspect of the present invention, a radar apparatus to detect an object may include a storage unit including a first storage part configured to successively update stored contents thereof based on a detection result that is obtained according to a radar scan, and a second storage part configured to store a copy of information stored in the first storage part based on a copy command; and an output control unit configured to copy and store a first detection result that is obtained by a first radar scan in the second storage part before stored contents of the first storage part are updated based on a second detection result that is obtained according to a second radar scan next to the first radar scan, and to read and output stored contents from one of the first storage part and the second storage part storing the first detection result during both time periods before and after the update.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram for explaining an operation in a third mode.

DESCRIPTION OF EMBODIMENTS

Preferred embodiments of the present invention will be described with reference to the accompanying drawings.

One embodiment of the disclosed radar apparatus and computer-readable storage medium may use a first storage part to store a detection result of an object detected based on a reflected wave with respect to a transmission wave, and a second storage part to copy and store information stored in the first storage part based on a copy command, and select one of the first storage part and the second storage part as an access destination, in order to output the detection result stored in the storage part at the access destination.

Another embodiment of the disclosed radar apparatus and computer-readable storage medium may use a first storage part to successively update stored contents based on a detection result obtained from a radar scan, and a second storage part to copy and store information stored in the first storage part based on a copy command, and copy a first detection result obtained according to a first radar scan to the second storage part before updating the stored contents of the first storage part based on a second detection result obtained according to a second radar scan that is next to the first radar scan, in order to read and output the stored contents from one of the first storage part and the second storage part storing the first detection result during both time periods before and after the updating.

A description will now be given of the radar apparatus and the computer-readable storage medium in each embodiment according to the present invention.

Figure 1:
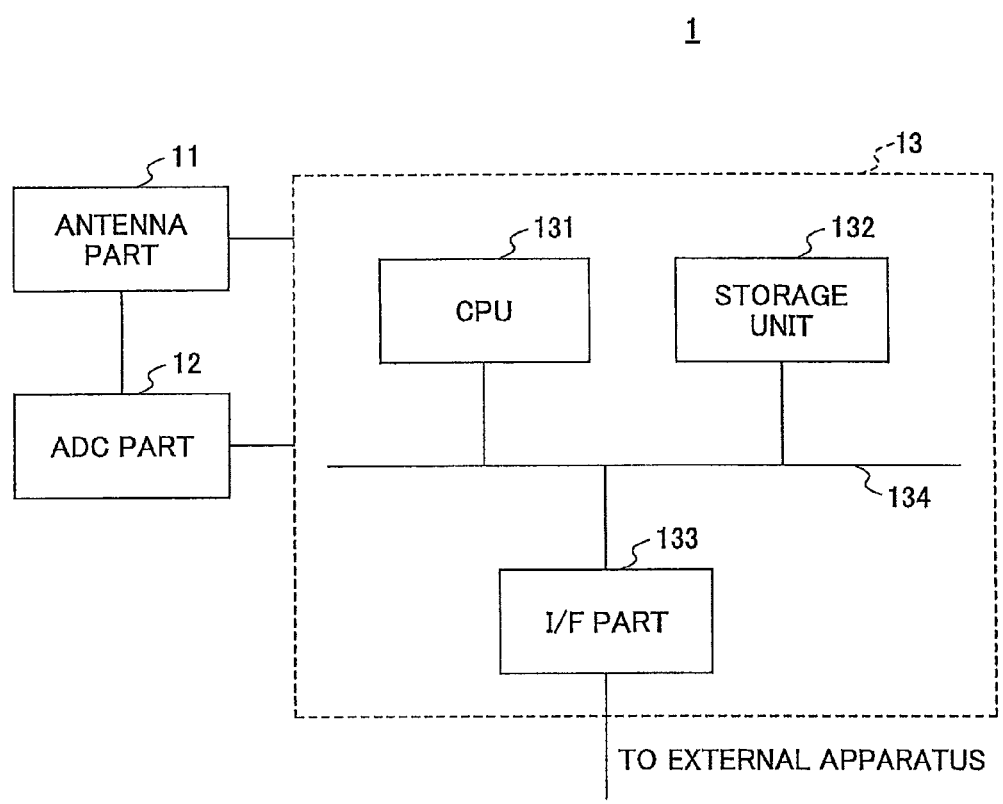
FIG. 1 is a block diagram illustrating an example of a hardware configuration of a radar apparatus in one embodiment.

FIG. 1 is a block diagram illustrating an example of a hardware configuration of a radar apparatus in one embodiment. A radar apparatus 1 illustrated in FIG. 1 may include an antenna part 11, an ADC (Analog-to-Digital Converter) part 12, and a signal processing part 13. The antenna part 11 may transmit a transmission wave of a transmission signal from the signal processing part 13 with respect to a scan region that includes a detection target (not illustrated), and receive a reflected wave from the detection target and the like. The detection target is an example of an object. The reflected wave received by the antenna part 11 may be converted into a digital signal by the ADC part 12, and supplied to the signal processing part 13.

The signal processing part 13 may have a configuration including a CPU (Central Processing Unit) 13 which is an example of a processor, a storage unit 132, and an interface (hereinafter simply referred to as "I/F") part 133 that are connected via a bus 134. The I/F part 133 is an example of an interface means that provides an interface with respect to an external apparatus (not illustrated). The connection of the CPU 131, the storage unit 132, and the I/F part 133 is not limited to the connection using the bus 134.

The CPU 13 may control the entire signal processing part 13, and cause the signal processing part 13 to realize functions of the radar apparatus 1 by executing a program. The storage unit 132 may store one or more programs to be executed by the CPU 131, and various data including data used by operations or computations executed by the CPU 131, intermediate data of the operations or computations, data (including measured data and detection data) of the detection target, and log data. The program may cause the CPU 131 to process the reflected wave received by the antenna part 11. The storage unit 132 is an example of a storage means that provides a first storage part (or first storage region) and a second storage part (or second storage region) to be described later. The storage unit 132 may be formed by one or a plurality of storage units or storage devices.

The storage unit 132 may form a non-transitory computer-readable medium. The computer-readable storage medium may be formed by a semiconductor memory device (or memory). In addition, in a case in which the computer-readable storage medium is formed by a magnetic recording medium, an optical recording medium, a magneto-optic recording medium, or the like, the storage unit 132 may be formed by a reader and writer that reads and writes information from and to the loaded recording medium. The I/F part 133 may communicate with the external apparatus by cable communication or wireless communication.

Figure 2:
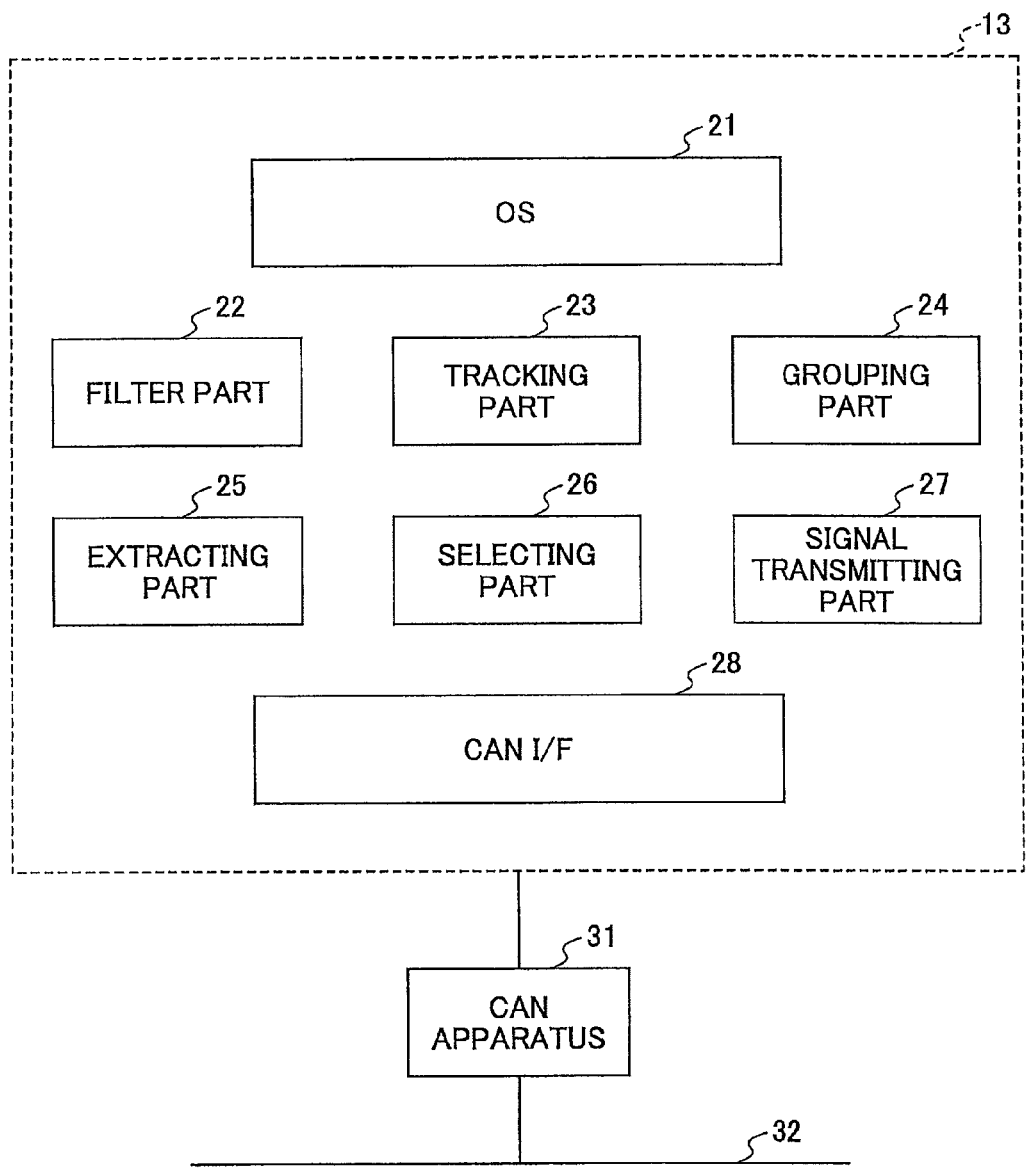
FIG. 2 is a block diagram illustrating an example of a software configuration of the radar apparatus in one embodiment.

FIG. 2 is a block diagram illustrating an example of a software configuration of the radar apparatus in one embodiment. In the example illustrated in FIG. 2, the signal processing part 13 may be connected to a CAN (Control Area Network) apparatus 31 which is an example of the external apparatus. The CAN apparatus 31 may be connected to a CAN 32.

The signal processing part 13 may include an OS (Operating System) 21, a filter part 22, a tracking part 23, a grouping part 24, an extracting part 25, a selecting part 26, a signal transmitting part 27, and a CAN I/F part 28. Functions of each of the parts 21 through 28 of the signal processing part 13 may be realized by the CPU 131 when the CPU 131 executes the program. Each of the parts 22 through 28 may realize the respective functions under control of the OS 21.

The signal transmitting part 27 may generate and transmit a transmission signal to the antenna part 11 according to a known method, and a transmission wave may be transmitted from the antenna part 11.

Based on a reflected wave received via the antenna part 11 with respect to the transmission wave transmitted from the antenna part 11, the filter part 22 may subject measured data (or detection result) of the detection target, generated according to a known method, to a filtering process. In a case in which the radar apparatus 1 is formed by an FM-CW radar apparatus, for example, the detection target may be detected by pairing a difference between the transmission wave and the reflected wave in a frequency raising interval, and a difference between the transmission wave and the reflected wave in a frequency lowering interval. The measured data of the detection target, generated as described above, may include parameters such as a distance from the radar apparatus 1 to the detection target, an angle from a center of a scan angle range of the radar apparatus 1, for example, to the position of the detection target, a velocity of the detection target, an intensity of the reflected wave from the detection target, and the like. Because a moving direction of the detection target may be detected based on whether the velocity of the detection target has a positive value or a negative value, the parameters described above may include the velocity of the detection target. The filtering process may generate detection data in which the detection targets are filtered or narrowed down using a threshold value that is set with respect to each of the parameters.

The tracking part 23 may perform a tracking process to confirm a continuity of the detection data of the detection target that is generated, and to judge, as the detection data of the detection target that is to be tracked, the detection data having a high continuity greater than or equal to a threshold value that is set with respect to the continuity of the detection data, in order to reduce noise and the like.

The grouping part 24 may perform a grouping process to judge a plurality of detection targets having positions, velocities, and the like that have differences less than a predetermined value as a single detection target according to a known method, and group these plurality of detection targets into a single group, amongst the detection data of the detection targets, in order to merge the detection data of the plurality of detection targets within the single group.

The extracting part 25 may perform an extracting process to sort the detection data of the detection targets according to a predetermined condition with respect to the parameters described above, in order to assign priority orders to the detection data. For example, the extracting part 25 may extract and output the detection data starting from the detection data having a highest priority order, according to the number of data to be output, for example.

The filtering part 22, the tracking part 23, the grouping part 24, and the extracting part 25 may form an example of a detecting means that detects the detection target based on the reflected wave with respect to the transmission wave, and outputs the detection result. The detection data subjected to the processing in the filtering part 22, the tracking part 23, the grouping part 24, and the extracting part 25 may be stored in the storage unit 132. In this example, the detection data subjected to the extracting process of the extracting part 25 may be stored in the first storage part (or first storage region) of the storage unit 132.

The selecting part 26 may output a copy command to instruct copying of the detection data stored in the first storage part (or first storage region) of the storage unit 132 to a second storage part (or second storage region) of the storage unit 132, when the selecting part 26 judges that the detection data of the detection targets stored in the first storage part exceeds a number (or amount) that may be output (that is, output to the outside of the radar apparatus 1) at one timing (or by one transfer). When the selecting part 26 outputs the copy command, the selecting part 26 selects the second storage part of the storage unit 132 as an access destination.

In addition, when the selecting part 26 selects the first storage part of the storage unit 132 as the access destination, the selecting part 26 may perform a selecting process to read a predetermined number of detection data from the first storage part, as output targets, starting from the first detection data stored in the first storage part. On the other hand, when the selecting part 26 selects the second storage part of the storage unit 132 as the access destination, the selecting part 26 may perform a selecting process to read a predetermined number of detection data from the second storage part, as output targets, starting from the detection data that is non-selected as the output target (or transmission target) and non-output (non-transmitted). "Non-selected" may mean "not yet selected", "non-output" may mean "not yet output", and "non-transmitted" may mean "not yet transmitted".

The radar apparatus 1 may detect the detection targets by repeating the transmission of the transmission wave and the reception of the reflected wave for every predetermined time, and thus, the first storage part may be overwritten with new detection data for every this predetermined time. When the number of detection data stored in the first storage part exceeds the number that may be output at one timing (or by one transfer), the selecting part 26 may instruct the detection data stored in the first storage part to be copied to the second storage part, and output the detection data stored in the second storage part at the next output timing. The contents copied to the second storage part may not necessarily be the entire contents of the first storage part, and may be limited to the non-transmitted detection data within the first storage part.

The selecting part 26 may judge whether or not to output the copy command, depending on the number of detection data stored in the first storage part. In this case, when the number of detection data stored in the first storage part is less than or equal to the number that may be output at one timing (or by one transfer), the detection data stored in the first storage part need not be copied to the second storage part. Hence, the selecting part 26 may perform the selecting process to determine whether to output the detection data stored in the first storage part in divisions (or segments) at two or more timings (or by two or more transfers) or to output the detection data stored in the first storage part at one timing (or by one transfer), depending on the number of the detection data stored in the first storage part. As a result, the selecting process enables the output of the detection data, closer to a real-time output, when compared to a case in which the detection data are transmitted in divisions (or segments) every time.

The timing at which the detection data are copied from the first storage part to the second storage part may be any time before the first storage part is next updated. In other words, the detection data may be copied to the second storage part immediately after the detection data are stored in the first storage part, or the detection data may be copied to the second storage part immediately before the first storage part is next updated.

The selecting part 26 may function as an example of a selecting means that selects one of the first storage part and the second storage part as the access destination, and outputs the detection result stored in one of the first storage part and the second storage part that is selected as the access destination.

In addition, the selecting part 26 may function as an example of a control means that copies a first detection result obtained according to a first radar scan to the second storage part before the storage contents of the first storage part is updated based on a second detection result obtained according to a second radar scan performed next to the first radar scan, and reads and outputs the stored contents from one of the first storage part and the second storage part that stores the first detection result, during both time periods before and after the updating.

The CAN I/F 28 may output the detection result stored in the storage part of the storage unit 132 selected by the selecting part 26 to the CAN 32 via the CAN apparatus 31.

Accordingly, this embodiment may place priority on the number (or amount) of the detection data in a spatial direction, and decimate the detection data in a time direction. In addition, new detection data measured while the detection data is decimated in the time direction may contribute to the processing of the tracking part 23 and the like. In addition, when the number of detection data enables the detection data to be output at one timing (by one transfer), the newly measured detection data may be used as subsequent detection data. Whether the detection data output from the radar apparatus 1 is transferred in divisions (or segments) may be detected from a flag that is written in a part of N-th object information included in each packet of the detection data that are output, where N denotes the number of detection data that may be output at one timing (or by one transfer). For example, the CAN apparatus 31 may decode the detection data by a processing based on the flag. The CAN apparatus 31 that receives the detection data output from the radar apparatus 1 may detect a state of traffic in each lane of a road, an obstructing object such as trash existing on the lane of the road, and the like.

The transfer of the detection data in divisions (or segments) may be effective in a system that places importance on the number of detection targets that are detectable at one time rather than an updating frequency of the detection data. For example, such a system may include a traffic counter that measures the amount of traffic per unit time, a traffic jam length detection system that detects the state of traffic jam, an obstructing object detection system that detects a stationary detection target on the road as the obstructing object, and the like. While the detection data are transferred in divisions (or segments), the detection data that are output remain old, however, the continuity of the detection data at the time of the updating may be maintained because the newly measured detection data contribute to the processing of the tracking part 23 and the like.

Figure 3:
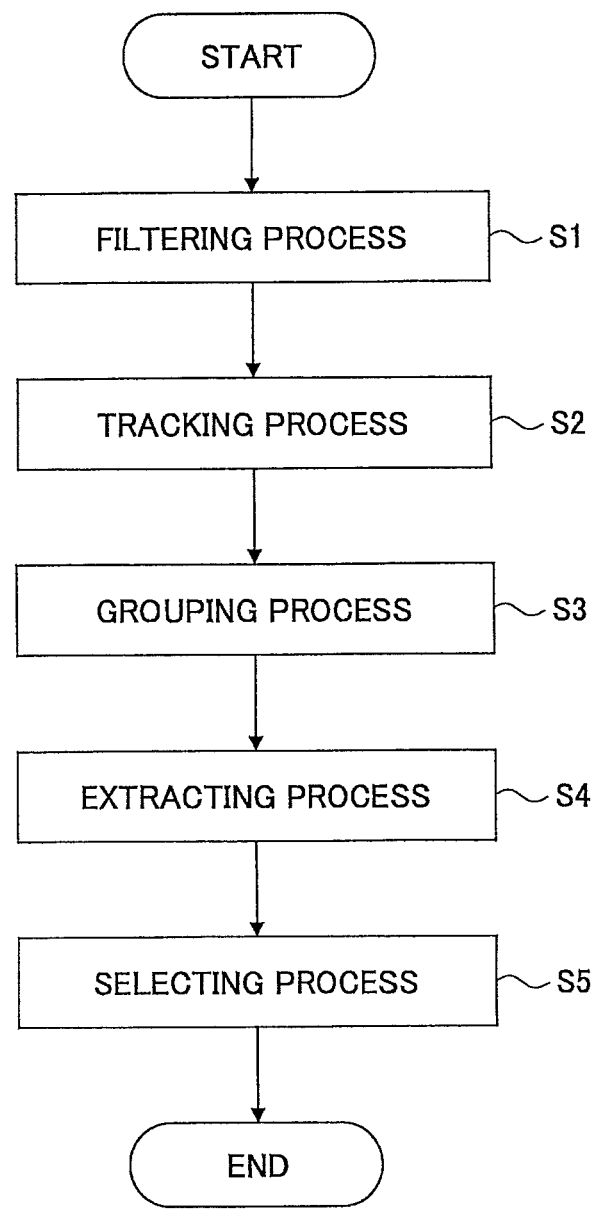
FIG. 3 is a flow chart for explaining an example of a process of the radar apparatus.

FIG. 3 is a flow chart for explaining an example of a process of the radar apparatus. In step S1 illustrated in FIG. 3, the filtering part 22 executes the filtering process. In step S2, the tracking part 23 executes the tracking process. In step S3, the grouping part 24 executes the grouping process. In step S4, the extracting part 25 executes the extracting process. In step S5, the selecting part 26 executes the selecting process, and the process ends. Of course, the detection result selected by the selecting process may be output from the radar apparatus 1 to the external apparatus that is communicable with the radar apparatus 1. The executing order of steps S2 and S3 may be reversed, in order to perform the grouping process of step S3 before the tracking process of step S2.

Figure 4:
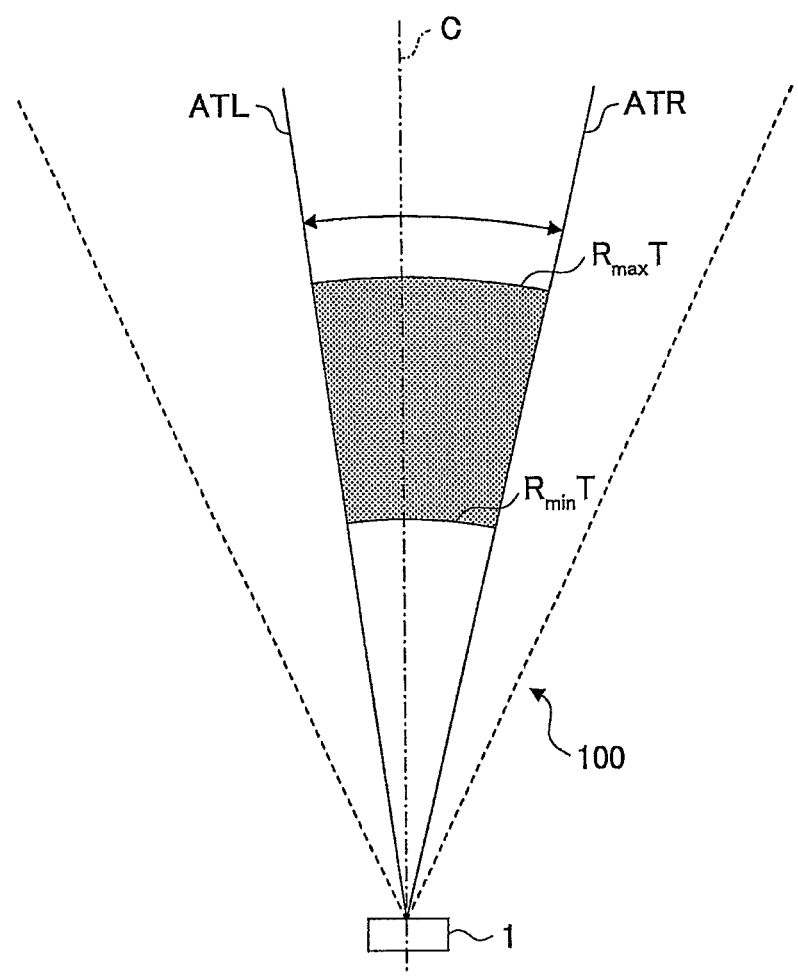
FIG. 4 is a diagram for explaining an example of a filtering process using a distance to a detection target and a threshold value of an angle from a center of a scan angle range to a position of the detection target.

A description will be given of an example of the filtering process of step S1, by referring to FIGS. 4 and 5. FIG. 4 is a diagram for explaining an example of the filtering process using a distance from the radar apparatus 1 to a detection target and a threshold value of an angle from a center C of a scan angle range 100 of the radar apparatus 1 to a position of the detection target. In this example, the filtering process narrows down the measured data of the detection target to the detection data within the scan angle range 100 illustrated in FIG. 4, and also narrows down the detection data to an angle range between a minimum threshold value ATL of an angle to the left direction (or counterclockwise direction) from the center C and a maximum threshold value ATR of an angle to the right direction (clockwise direction) from the center C. It is assumed for the sake of convenience in this example that the right direction (clockwise direction) from the center C takes a positive value.

Figure 5:
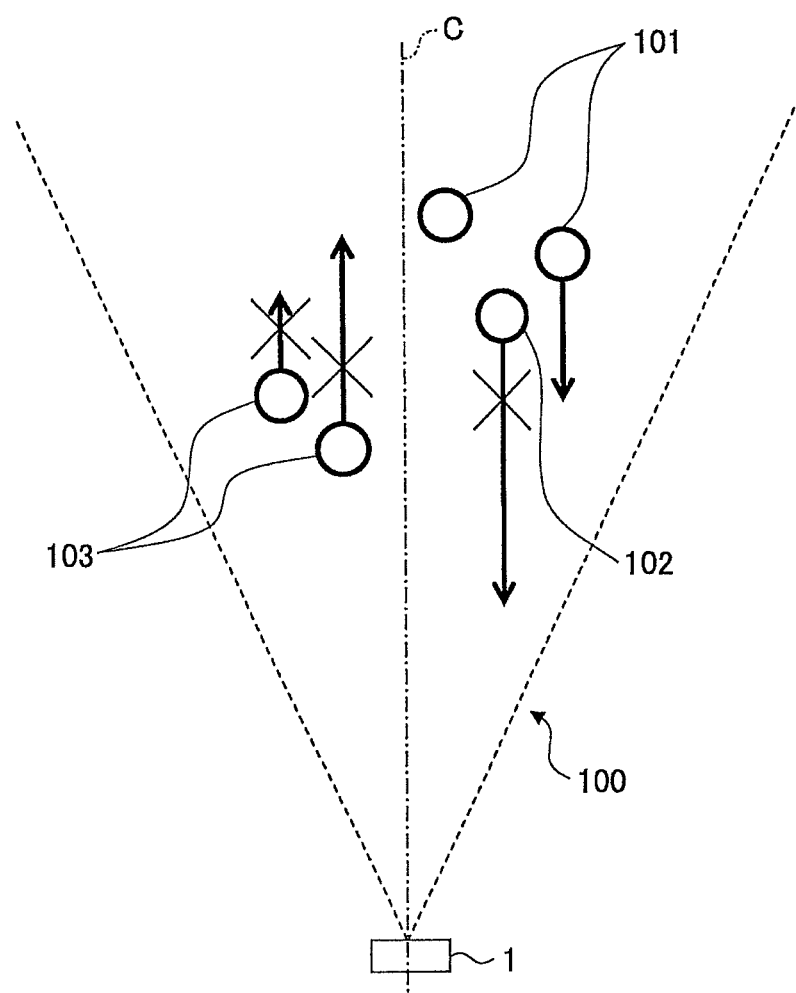
FIG. 5 is a diagram for explaining an example of a filtering process using a moving direction of the detection target and a threshold value of a velocity.

FIG. 5 is a diagram for explaining an example of the filtering process using the moving direction of the detection target and the threshold value of the velocity. In this example, the filtering process narrows down the measured data of the detection target to the detection data within the scan angle range 100 illustrated in FIG. 5, and also narrows down the detection data to the detection data of a detection target 101 having the moving velocity less than or equal to a predetermined velocity and the moving direction that is a downward direction in FIG. 5. In this case, even if a target object 102 is within the scan angle range 100 and the moving direction thereof is the downward direction, the detection data of this target object 102 is excluded because the moving velocity thereof exceeds the predetermined velocity. Further, even if target objects 103 are within the scan angle range 100 and the moving velocities thereof are less than or equal to the predetermined velocity, the detection data of these target objects 103 are excluded because the moving directions thereof are an upward direction which is other than the downward direction.

Figure 6:
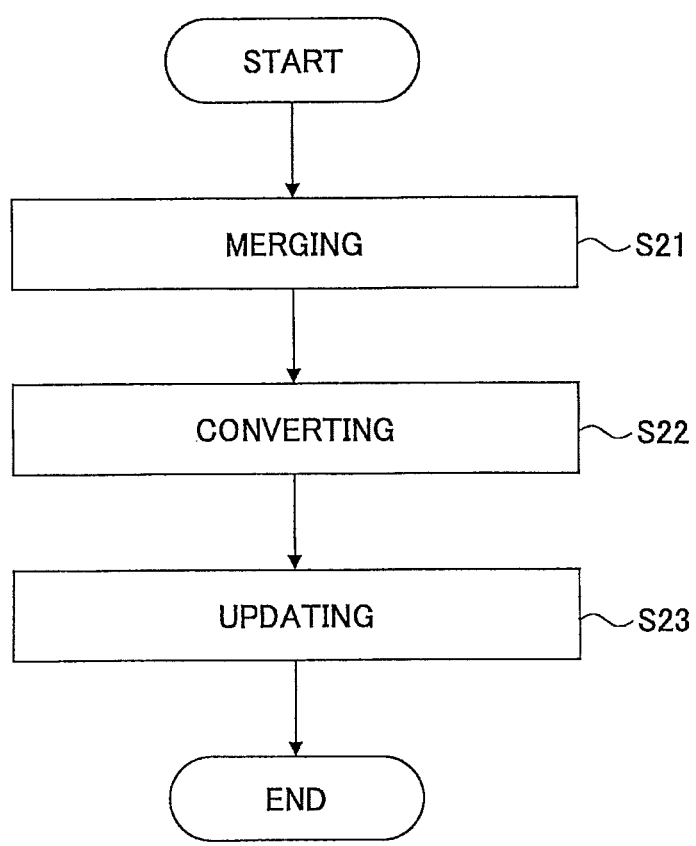
FIG. 6 is a flow chart for explaining an example of a tracking process.

FIG. 6 is a flow chart for explaining an example of the tracking process of step S2. In step S21 illustrated in FIG. 6, the tracking part 23 performs a merging process. In step S22, the tracking part 23 performs a converting process. In step S23, the tracking part 23 performs an updating process, and the process ends.

Figure 7:
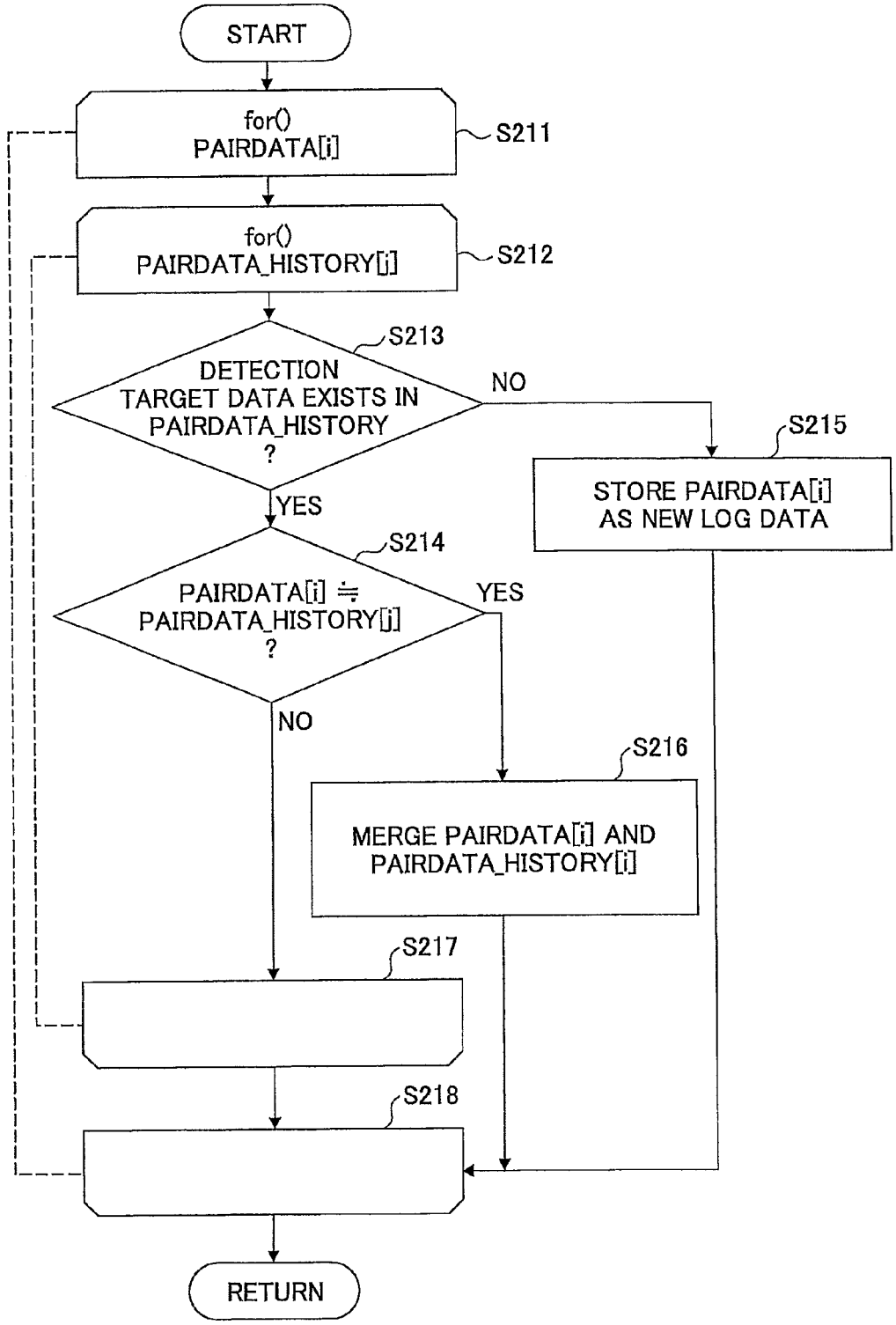
FIG. 7 is a flow chart for explaining an example of a merging process.

FIG. 7 is a flow chart for explaining an example of the merging process of step 21. In step S211 illustrated in FIG. 7, the tracking part 23 acquires detection data PAIRDATA[i] by pairing a difference between the transmission wave and the reflected wave in a frequency raising interval, and a difference between the transmission wave and the reflected wave in a frequency lowering interval. In step S212, the tracking part 23 acquires a log (hereinafter referred to as "log data") PAIRDATA_HISTORY[j] of the detection data stored in the storage unit 132. In step S213, the tracking part 23 decides whether data of the detection target identical to the detection data PAIRDATA[i] acquired in step S211 exist within the stored log data PAIRDATA_HISTORY[j]. The process advances to step S214 when the decision result in step S213 is YES, and the process advances to step S215 when the decision result in step S213 is NO. In step S214, the tracking part 23 decides whether detection data approximately the same as (that is, with a difference within a predetermined range of) the acquired detection data PAIRDATA[i] exists within the log data PAIRDATA_HISTORY[j]. The process advances to step S216 when the decision result in step S214 is YES, and the process advances to step S217 when the decision result in step S214 is NO. In step S215, the tracking part 23 stores the acquired detection data PAIRDATA[i] in the storage unit 132 as new log data PAIRDATA_HISTORY[j], and the process advances to step S218. In step S216, the tracking part 23 merges the acquired detection data PAIRDATA[i] and the stored log data PAIRDATA_HISTORY[j], and the process advances to step S218. In step S217, the tracking part 23 repeats the processes of steps S212 through S216 a predetermined number of times with respect to the stored log data PAIRDATA_HISTORY[j], and the process advances to step S218. In step S218, the tracking part 23 repeats the processes of steps S211 through S217 a predetermined number of times with respect to the acquired detection data PAIRDATA[i], and the process advances to step S22 illustrated in FIG. 6.

Figure 8:
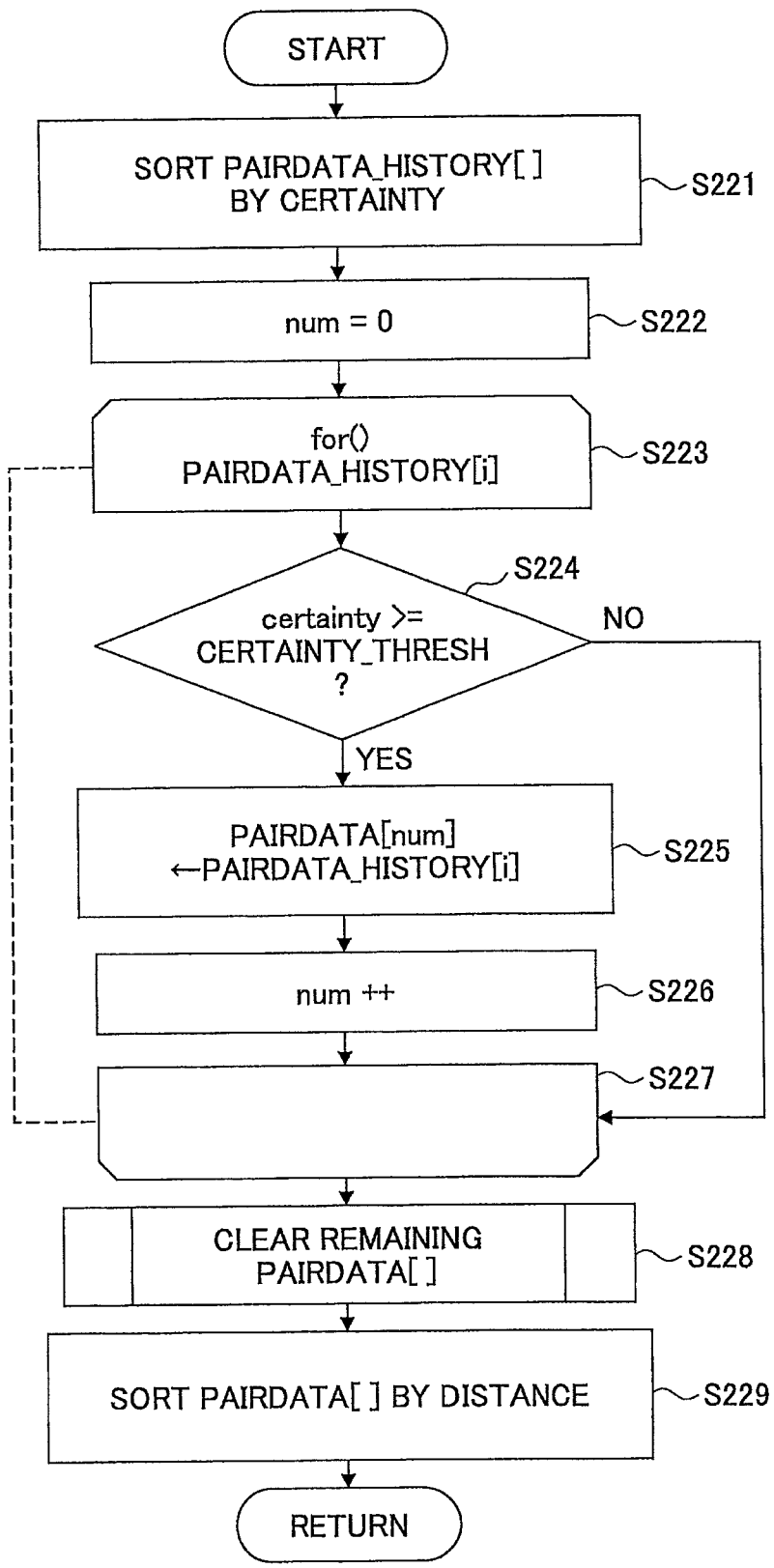
FIG. 8 is a flow chart for explaining an example of a converting process.

FIG. 8 is a flow chart for explaining an example of the converting process of step S22. In step S221 illustrated in FIG. 8, the tracking part 23 sorts the stored log data array PAIRDATA_HISTORY[ ] in an order starting from the data having a highest certainty of being the detection data of the detection target. For example, the certainty of the data being the detection data of the detection target may be computed according to a known method based on parameters such as the distance from the radar apparatus 1 to the detection target, the angle from the center C of the scan angle range of the radar apparatus 1, for example, to the position of the detection target, the velocity of the detection target, the moving direction of the detection target, the intensity of the reflected wave obtained from the detection target, and the like. In step S222, the tracking part 23 sets a suffix variable num of the PAIRDATA[ ] array that is the data transfer destination to num=0. In step S224, the tracking part 23 decides whether the certainty of the data being the detection data of the detection target is greater than or equal to a threshold value CERTAINTY_THRESH. The process advances to step S225 when the decision result in step S224 is YES, and the process advances to step S227 when the decision result in step S224 is NO. In step S225, the tracking part 23 converts the object data stored in the log data PAIRDATA_HISTORY[i] into detection data PAIRDATA[num]. In step S226, the tracking part 23 increments the parameter n to n=n+1 (or n++). In step S227, the tracking part 23 repeats the processes of steps S223 through S226 a predetermined number of times with respect to the log data PAIRDATA_HISTORY[i]. In step S228, the tracking part 23 clears remaining elements of the structure PAIRDATA[ ] array that are not embedded with data by the processes of steps S223 through S227. For example, NULL that indicates no data may be stored in each element of PAIRDATA[ ] to which no data conversion is made from PAIRDATA_HISTORY[ ]. In step S229, the tracking part 23 sorts the detection data PAIRDATA[i] in an order starting from the data of the detection target having the closest distance to the detection target, and the process advances to step S23 illustrated in FIG. 6.

Figure 9:
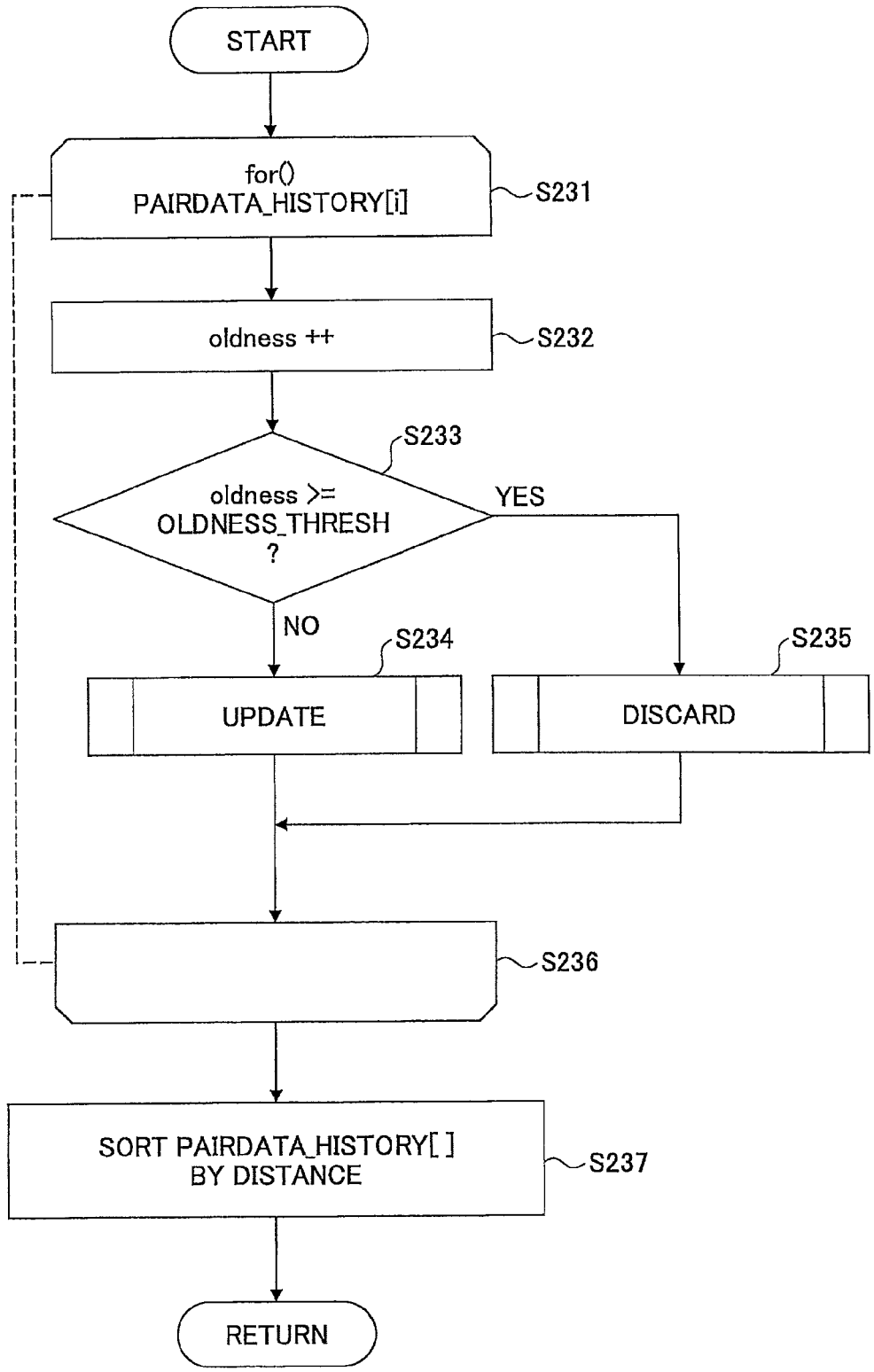
FIG. 9 is a flow chart for explaining an example of an updating process.

FIG. 9 is a flow chart for explaining an example of the updating process of step S23. In step S231 illustrated in FIG. 9, the tracking part 23 acquires the log data PAIRDATA_HISTORY[i]. In step S232, the tracking part 23 increments a parameter oldness that indicates the oldness of the log data PAIRDATA_HISTORY[i] to oldness=oldness+1. In step S233, the tracking part 23 decides whether the parameter oldness is greater than or equal to a threshold value OLDNESS_THRESHOLD. The process advances to step S234 when the decision result in step S233 is NO, and the process advances to step S235 when the decision result in step S233 is YES. In step S234, the tracking part 23 judges that the log data PAIRDATA_HISTORY[i] is new and updates the log data, and the process advances to step S236. In step S235, the tracking part 23 judges that the log data PAIRDATA_HISTORY[i] is a predetermined time old or older (or validity expired) and discards the log data, and the process advances to step S236. In step S237, the tracking part 23 sorts the log data PAIRDATA_HISTORY[i] in an order starting from the data of the detection target having the closest distance to the detection target, and the process returns to the process of FIG. 6 and the tracking process ends.

Figure 10:
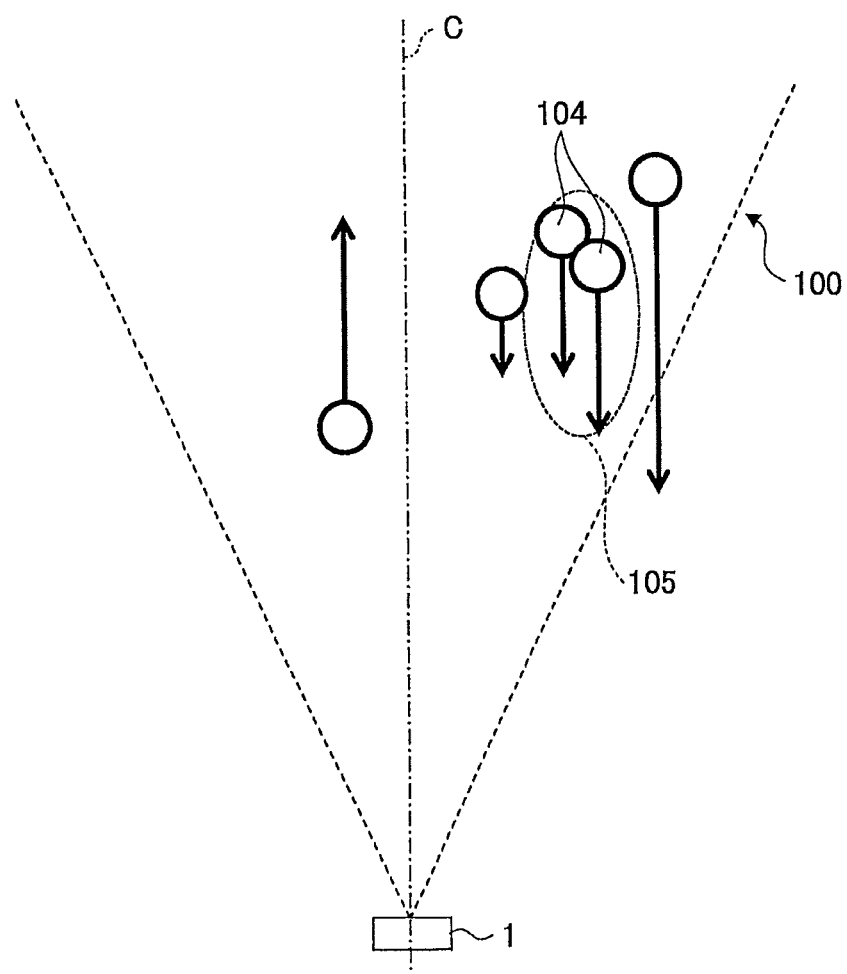
FIG. 10 is a diagram for explaining an example of a grouping process.

FIG. 10 is a diagram for explaining an example of the grouping process. In FIG. 10, those parts that are the same as those corresponding parts in FIG. 4 are designated by the same reference numerals, and a description thereof will be omitted. In this example, the grouping process may group a plurality of detection targets 104 within the scan angle range 100 and having positions and velocities that have differences less than a predetermined value into a single group 105 according to a known method. In addition, the grouping process may merge the detection data of the plurality of detection targets 104 within the single group 105.

Figure 11:
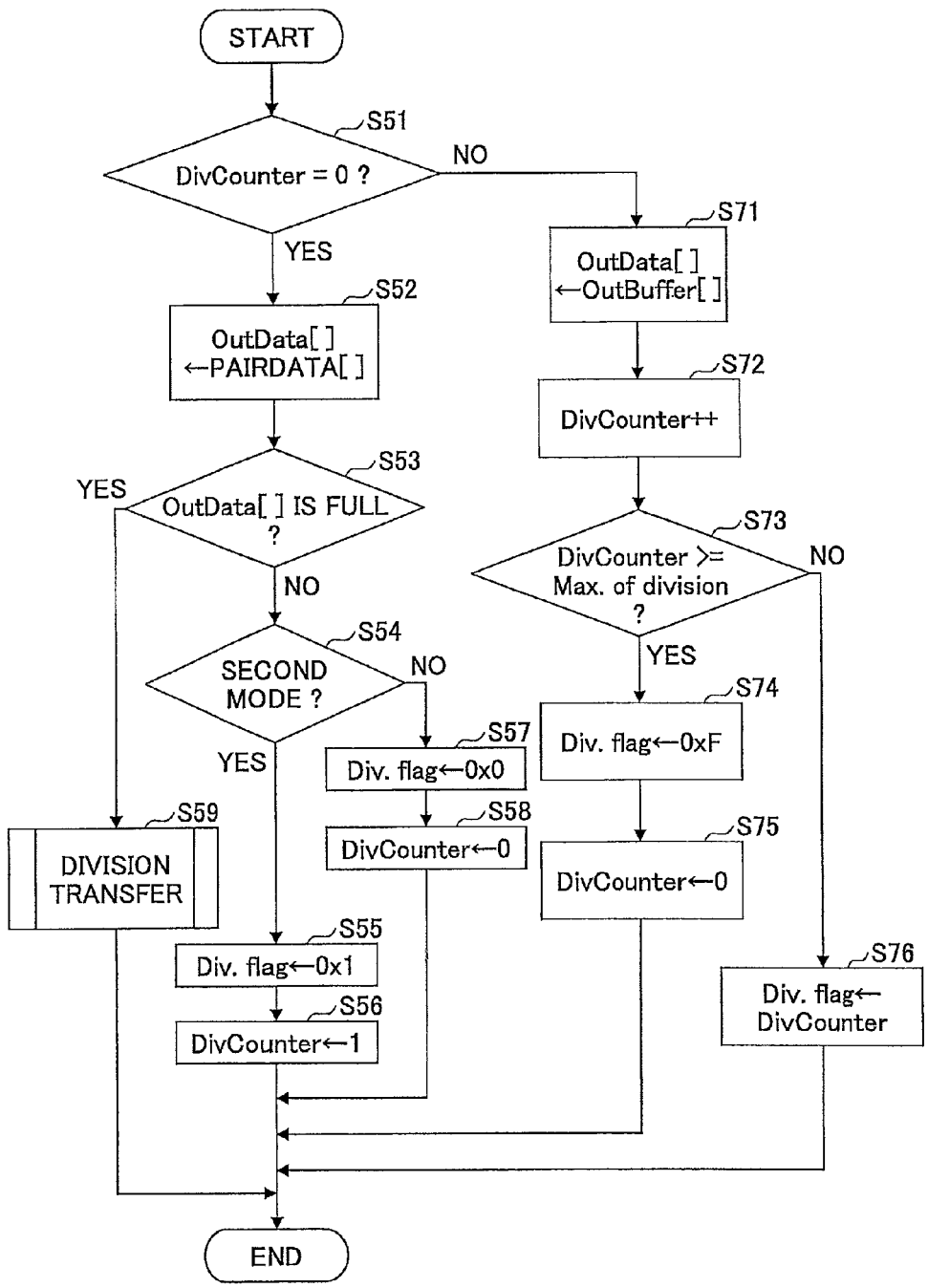
FIG. 11 is a flow chart for explaining an example of a selecting process.

FIG. 11 is a flow chart for explaining an example of the selecting process. In step S51 illustrated in FIG. 11, the selecting part 26 decides whether a counter DivCounter is 0. For example, the counter DivCounter may be an internal counter of the CPU 131. When the decision result in step S51 is YES, the process advances to step S52. In step S52, the selecting part 26 sets a storage part (or storage region) OutData[ ] within the storage unit 132, that is to output the detection data subjected to the filtering process, the tracking process, the grouping process, and the extracting process described above to the outside of the radar apparatus 1 to a first storage part (or first storage region) PAIRDATA[ ] of the storage unit 132. In step S53, the selecting part 26 decides whether a storage capacity of the storage part OutData[ ] is full (that is, no usable storage region exists). The process advances to step S54 when the decision result in step S53 is NO, and the process advances to step S59 when the decision result in step S53 is YES.

In step S54, the selecting part 26 decides whether a second mode is set. The process advances to step S54 when the decision result in step S54 is YES, and the process advances to step S57 when the decision result in step S53 is NO. In step S55, the selecting part 26 sets a flag Div.flag to a value 0x1 indicating the second mode, or indicating a third mode and that the number of detection data obtained in 1 measuring period of the radar apparatus 1 exceeds a predetermined number N. In step S56, the selecting part 26 sets the counter DivCounter to 1. In step S57, the selecting part 26 sets the flag Div.flag to a value 0x0 indicating a first mode, or indicating the second or third mode and that the number of detection data obtained in 1 measuring period is less than or equal to the predetermined number N. In step S58, the selecting part 26 resets the counter DivCounter to 0. After step S56 or step S58, the process ends. The flag Div.flag assumes a value 0xi indicating an ith (i=1, . . . , n) division transfer of n division transfers to be described later, when outputting the detection data in the third mode and the number of detection data obtained in 1 measuring period of the radar apparatus 1 exceeds the predetermined number N, that is, the number of objects that may be transmitted at one transmission timing from the radar apparatus 1 to the network via the CAN I/F 28 is exceeded.

Figure 12:
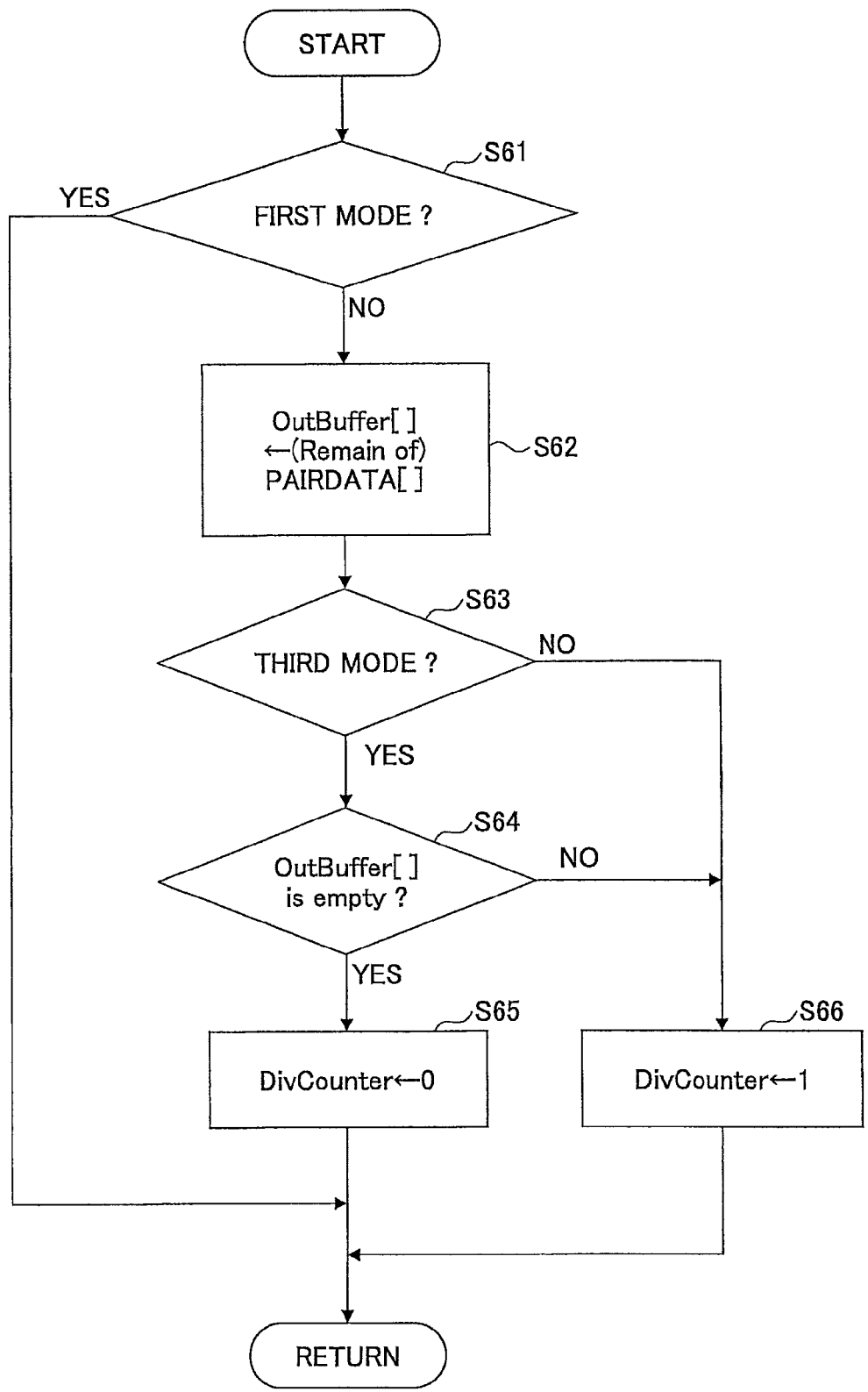
FIG. 12 is a flow chart for explaining an example of a division transfer.

FIG. 12 is a flow chart for explaining an example of the division transfer of step S59. In step S61 illustrated in FIG. 12, the selecting part 26 decides whether the first mode is set. When the decision result in step S61 is YES, the process returns to the process of FIG. 11 and the selecting process ends. On the other hand, the process advances to step S62 when the decision result in step S61 is NO. In step S62, the selecting part 26 sets a region (Remain of) in which the non-transferred detection data are stored, that is, a region in which the predetermined number N of detection data from the start (or first) to the N-th detection data of PAIRDATA[ ] are stored, within the first storage part PAIRDATA[ ] of the storage unit 132, to the second storage part (or second storage region) OutBuffer[ ] of the storage unit 132. In step S63, the selecting part 26 decides whether the third mode is set. The process advances to step S64 when the decision result in step S63 is YES. In step S64, the selecting part 26 decides whether the second storage part OutBuffer[ ] is vacant (or empty). The process advances to step S65 when the decision result in step S64 is YES. In step S65, the selecting part 62 resets the counter DivCounter to 0, and the process returns to the process of FIG. 11, and the selecting process ends. On the other hand, when the decision result in step S64 or step S65 is NO, the process advances to step S66. In step S66, the selecting part 26 sets the counter DivCounter to 1, and the process returns to the process of FIG. 11, and the selecting process ends.

Returning now to the description of FIG. 11, when the decision result in step S51 is NO, that is, when the division transfer process is executed, the process advances to step S71. In step S71, the selecting part 26 sets the storage part OutData[ ] within the storage unit 132 to be used to output the detection data to the outside of the radar apparatus 1, to the second storage part OutBuffer[ ].

The number of elements of OutData[ ] is set to the predetermined number N described above, that is, the number of objects transmitted at one transmission timing from the radar apparatus 1 to the network via the CAN I/F 28. In step S71, amongst OutBuffer[ ], the selecting part 26 stores the predetermined number N of elements in OutData[ ] starting from the [{(DivCounter−1)·N}+1]th element. For example, in a case in which DivCounter=1 and N=20, the elements of OutBuffer[ ] from OutBuffer[0] to [19] are stored in the OutData[ ]. Hence, in the case of PAIRDATA[ ], the predetermined number N of elements are stored in OutData[ ] starting from the [(DivCounter·N)+1]th element.

In step S72, the selecting part 26 increments the counter DivCounter to DivCounter=DivCounter+1. In step S73, the selecting part 26 decides whether the value of the counter DivCounter is a division transfer number n or greater. The division transfer number n will be described later. The process advances to step S74 when the decision result in step S73 is YES. In step S74, the selecting part 26 sets the flag Div.flag to a value 0xF indicating the last (that is, the n-th) transfer of the divided transfer number n in the third mode. In step S75, the selecting part 26 resets the counter DivCounter to 0, and the selecting process ends. On the other hand, the process advances to step S76 when the decision result in step S73 is NO. In step S76, the selecting part 26 sets the value of the flag Div.flag to the value of the counter DivCounter, and the selecting process ends.

The CAN I/F 28 outputs the data stored in OutData[ ] to the CAN 32 via the CAN apparatus 31.

Figure 13:
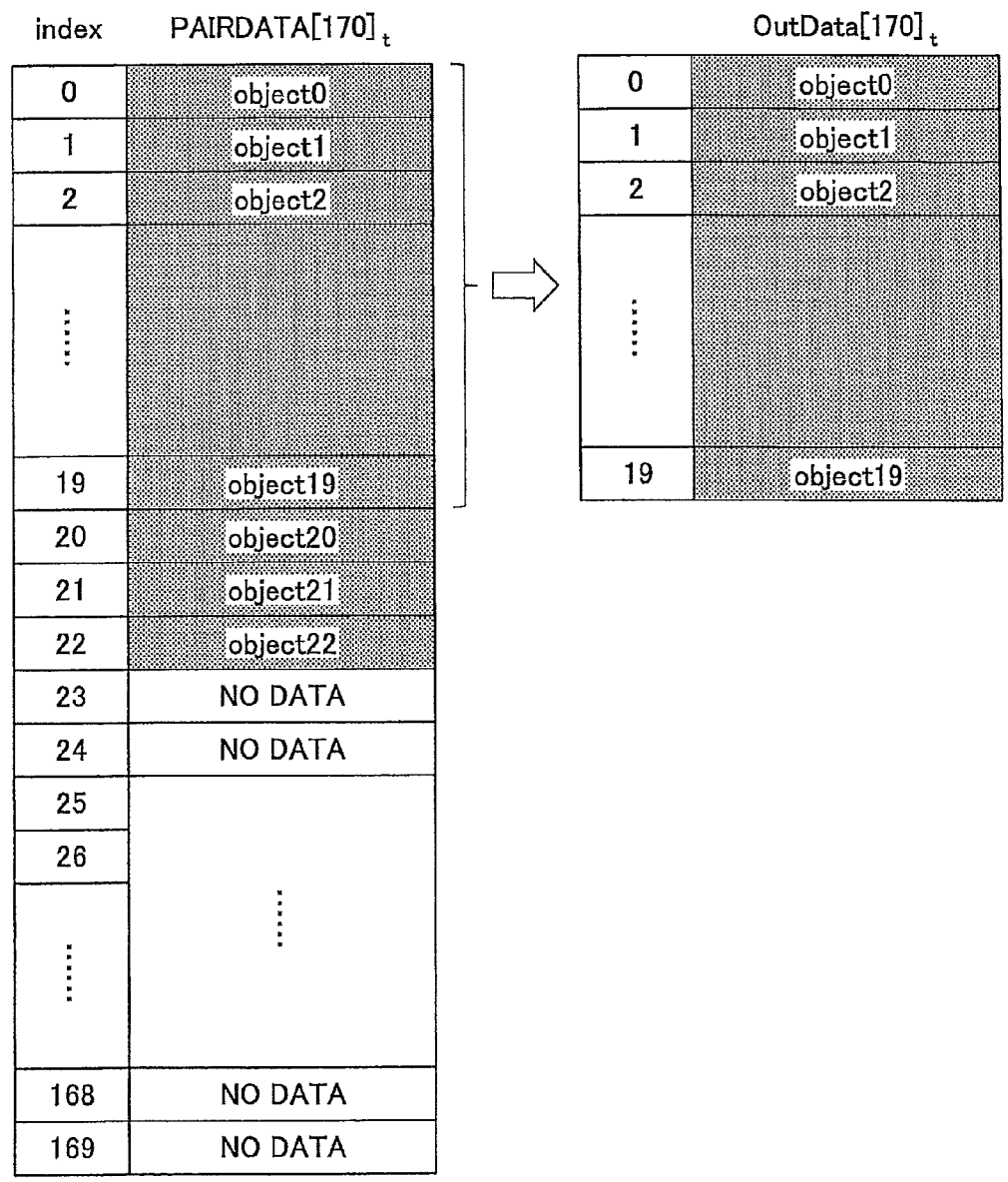
FIG. 13 is a diagram for explaining an operation in a first mode.

FIG. 13 is a diagram for explaining an operation in the first mode. FIG. 13 illustrates an example in which the detection data PAIRDATA[170] includes the detection data object0, . . . , object169 of 170 detection targets. For example, the measuring period of the radar apparatus 1 may be 50 ms, and the upper 20 detection data object0 through object19 are transferred from the first storage part PAIRDATA[ ] of the storage unit 132 to the storage part OutData[170] for every measuring period. In this example, the detection data of the detection target does not exist for indexes (or identifiers) 23 through 169 of the detection data, as indicated by NODATA. However, in the first mode, the upper predetermined number N (N=20 in this example) of detection data are stored in the storage part OutData[170] of the storage unit 132 and output outside the radar apparatus 1 for every measuring period, regardless of whether the detection data of the detection target exists. In addition, the detection data object20 through object169 exceeding the upper 20 detection data object0 through object19 are discarded for every measuring period and are not output.

Figure 14:
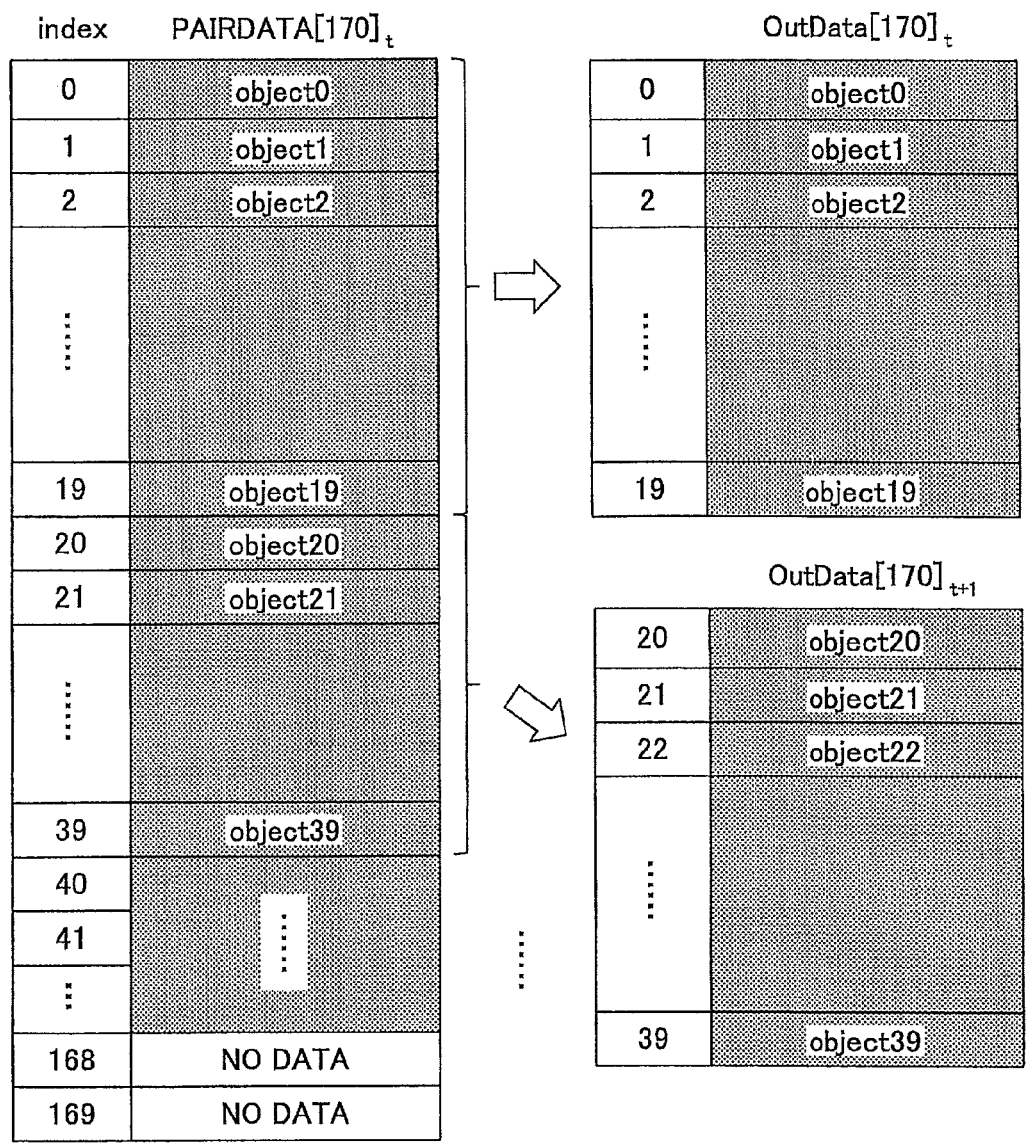
FIG. 14 is a diagram for explaining an operation in a second mode.

FIG. 14 is a diagram for explaining an operation in the second mode. FIG. 14 illustrates an example in which the detection data PAIRDATA[170] includes the detection data object0, . . . , object169 of 170 detection targets. For example, the measuring period of the radar apparatus 1 may be 50 ms, and the detection data object0 through object19, object20 through object39, . . . measured during a certain measuring period t (or the t-th radar scan) are transferred to and stored in the storage part OutData[170] of the storage unit 132, 20 detection data at a time, in n division transfers, where n denotes the division transfer number that is preset. For example, the detection data object0 through object19 measured during the measuring period t are transferred to the storage part OutData[170] of the storage unit 132 in a first transfer. In a second transfer corresponding to the measuring period t+1 (or (t+1)-th radar scan), the contents stored in the first storage part PAIRDATA[ ] may be overwritten with the detection data measured during the measuring period t+1, however, the detection data object20 through object39 measured during the measuring period t and not transferred by the first transfer but copied (or saved) in the second storage part OutBuffer[ ] may be transferred from the second storage part OutBuffer[ ] to the storage part OutData[170], and the division transfers amounting to the division transfer number n may be performed in a similar manner thereafter. In this example, the detection data of the detection target does not exist for indexes (or identifiers) 168 and 169 of the detection data, as indicated by NODATA. However, in the second mode, all of the detection data object0 through object169 measured during the measuring period t are transferred and stored in the storage part OutData[170] of the storage unit 132 and output outside the radar apparatus 1 by the division transfers amounting to the division transfer number n, regardless of whether the detection data of the detection target exists. In a case in which the division transfer number is n (n is a natural number satisfying n>1), 20n detection data measured during the measuring period t are output for every measuring period of 50 ms, and thus, the detection data measured during the measuring periods t+1 through t+n−1 are discarded and not output from the radar apparatus 1.

FIG. 15 is a diagram for explaining an operation in the third mode. FIG. 15 illustrates an example in which the detection data PAIRDATA[170] includes the detection data object0, . . . , object169 of 170 detection targets. In the third mode, when the number of detection data stored in the first storage part PAIRDATA[ ] of the storage unit 132 is such that all of the detection data may not be transferred in a single transfer, the detection data may be transferred in divisions to the storage part OutData[170] of the storage unit 132 for every N detection data. In addition, when the detection data of the detection target does not exist in the first storage part PAIRDATA[ ], no transfer of the detection data is performed. For example, the measuring period of the radar apparatus 1 may be 50 ms, and the upper N (N=20 in this example) detection data are stored in the storage part OutData[170] of the storage unit 132 for every measuring period.

In FIG. 15, the detection data object0 through object19 measured during the measuring period t is transferred from the first storage part PAIRDATA[ ] to the storage part OutData [170] in a first transfer. In a second transfer corresponding to the measuring period t+1 (or (t+1)-th radar scan), the contents stored in the first storage part PAIRDATA[ ] may be overwritten with the detection data measured during the measuring period t+1, however, the detection data object20 through object39 measured during the measuring period t and not transferred by the first transfer but copied (or saved) in the second storage part OutBuffer[ ] may be transferred from the second storage part OutBuffer[ ] to the storage part OutData [170], and the division transfers amounting to the division transfer number n may be performed in a similar manner thereafter. In this example, the detection data of the detection target does not exist for indexes (or identifiers) 40 through 169 of the detection data, as indicated by NODATA. Hence, even though the division transfer number n is not reached, the division transfer ends by the second transfer. In other words, the detection data identified by the indexes 40 through 169 are not transferred, and the division transfer is similarly performed with respect to the detection data object0, . . . that are measuring during the next measuring period t+2. For this reason, the division transfers may be completed in a small number of transfers. In this example, the detection data measured during the measuring period t+1 are discarded and not output from the radar apparatus 1.

According to the examples described above, the radar apparatus 1 may detect 170 detection targets in one measuring period, for example. However, depending on specifications of the CAN, for example, there are cases in which the radar apparatus 1 is only able to output the detection data of 20 detection targets in 1 measuring period, for example. On the other hand, when a long string of vehicles is detected and a relatively long traffic jam is detected, for example, it may be desirable to control the traffic light to change the duration in which the red light is turned ON. In such a case, rather than detecting the detection targets in real-time, it may be preferable to output the detection data of as much detection targets detected by the radar apparatus 1 as possible, so that the number of vehicles in the traffic jam may be estimated. In other words, in some situations, the number of detection targets detectable in one radar scan may be preferred over the increasing the detection data updating frequency. Hence, in the embodiment described above, the detection results that may not be output in one measuring period are output in divisions by a plurality of division transfers, in order to enable the detection results of a relatively large number of detection targets to be output even in a case in which the data transfer rate is relatively low.

The embodiment described may output detection results of a relatively large number of detection targets even in a case in which a data transfer rate is relatively low.

In addition, the embodiment described above may enable transfer of contents of a previous detection result, even in a case in which a transfer process to transfer stored contents of a detection result that is obtained according to the scan of the radar apparatus is not completed until an updating by a new detection result that is obtained according to a next scan of the radar apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radar apparatus to detect an object by transmitting a transmission wave, comprising:
   a detecting unit configured to detect the object based on a reflected wave of the transmission wave that is reflected from the object, to output a detection result of the object;
   a storage unit including a first storage part configured to store the detection result, and a second storage part configured to store a copy of information stored in the first storage part based on a copy command; and
   a selecting unit configured to select one of the first storage part and the second storage part as an access destination, to output the detection result stored in one of the first storage part and the second storage part selected as the access destination,
   wherein the selecting unit outputs the copy command when a number of detection results stored in the first storage part exceeds a number outputtable at one transfer timing, and selects the second storage part as the access destination when the copy command is output.

2. The radar apparatus as claimed in claim 1, wherein the selecting unit
   sets, as output targets, a predetermined number of detection results starting from a first detection result, amongst the detection results stored in the first storage part, when the first storage part is selected as the access destination, and
   sets, as the output targets, a predetermined number of detection results starting from a detection result that is not yet selected as the output target, amongst the detection results stored in the second storage part, when the second storage part is selected as the access destination.

3. The radar apparatus as claimed in claim 1, wherein the selecting unit judges whether to output the copy command, depending on the number of detection results output from the detecting unit and stored in the first storage part.

4. A radar apparatus to detect an object, comprising:
   a storage unit including a first storage part configured to successively update stored contents thereof based on a detection result that is obtained according to a radar scan, and a second storage part configured to store a copy of information stored in the first storage part based on a copy command; and
   an output control unit configured to copy and store a first detection result that is obtained by a first radar scan in the second storage part before stored contents of the first storage part are updated based on a second detection result that is obtained according to a second radar scan next to the first radar scan, and to read and output stored contents from one of the first storage part and the second storage part storing the first detection result during both time periods before and after the update,
   wherein the output control unit outputs the copy command when a number of first detection results stored in the first storage part exceeds a number outputtable at one transfer timing, and selects the second storage part as an access destination when the copy command is output.

5. The radar apparatus as claimed in claim 4, wherein the output control unit
   sets, as output targets, a predetermined number of first detection results starting from a first detection result at a start, amongst the first detection results stored in the first storage part, when the first storage part is selected as the access destination, and
   sets, as the output targets, a predetermined number of second detection results starting from a second detection result that is not yet selected as the output target, amongst the second detection results stored in the second storage part, when the second storage part is selected as the access destination.

6. The radar apparatus as claimed in claim 4, wherein the output control unit judges whether to output the copy command, depending on the number of first detection results that are obtained by the first radar scan and stored in the first storage part.

7. The radar apparatus as claimed in claim 4, wherein the output control unit copies the second detection result from the first storage part to the second storage part immediately after the first detection result is written in the first storage part.

8. The radar apparatus as claimed in claim 4, wherein the output control unit copies the first detection result to the second storage part immediately before the second storage part is next updated.

9. A non-transitory computer-readable storage medium having stored therein a program which, when executed by a computer of a radar apparatus, causes the computer to perform a process comprising:
- detecting an object based on a reflected wave of a transmission wave that is transmitted from an antenna part of the radar apparatus and is reflected from the object, to output a detection result of the object; and
- selecting one of a first storage part configured to store the detection result, and a second storage part configured to store a copy of information stored in the first storage part based on a copy command, as an access destination, to output the detection result stored in one of the first storage part and the second storage part selected as the access destination,
- wherein the selecting outputs the copy command when a number of detection results stored in the first storage part exceeds a number outputtable at one transfer timing, and selects the second storage part as the access destination when the copy command is output.

10. The non-transitory computer-readable storage medium as claimed in claim 9, wherein the selecting includes
- setting, as output targets, a predetermined number of detection results starting from a first detection result, amongst the detection results stored in the first storage part, when the first storage part is selected as the access destination, and
- setting, as the output targets, a predetermined number of detection results starting from a detection result that is not yet selected as the output target, amongst the detection results stored in the second storage part, when the second storage part is selected as the access destination.

11. The non-transitory computer-readable storage medium as claimed in claim 9, wherein the selecting judges whether to output the copy command, depending on the number of detection results output by the detecting and stored in the first storage part.

* * * * *